US012766492B2

(12) United States Patent
Sankar et al.

(10) Patent No.: US 12,766,492 B2
(45) Date of Patent: Oct. 20, 2026

(54) METHOD FOR PREPARATION OF CATALYST FOR RESIDUE HYDROCRACKING

(71) Applicant: HINDUSTAN PETROLEUM CORPORATION LIMITED, Bengaluru (IN)

(72) Inventors: Enumula Siva Sankar, Bengaluru (IN); Satyanarayana Murty Pudi, Bengaluru (IN); Kanuparthy Naga Raja, Bengaluru (IN); Ramachandra Rao Bojja, Bengaluru (IN)

(73) Assignee: HINDUSTAN PETROLEUM CORPORATION LIMITED, Bengaluru (IN)

( * ) Notice: Subject to any disclaimer, the term of this patent is extended or adjusted under 35 U.S.C. 154(b) by 219 days.

(21) Appl. No.: 18/845,658

(22) PCT Filed: Apr. 26, 2022

(86) PCT No.: PCT/IN2022/050389
§ 371 (c)(1),
(2) Date: Sep. 10, 2024

(87) PCT Pub. No.: WO2023/170696
PCT Pub. Date: Sep. 14, 2023

(65) Prior Publication Data

US 2025/0196110 A1 Jun. 19, 2025

(30) Foreign Application Priority Data

Mar. 10, 2022 (IN) ............................. 202241013052

(51) Int. Cl.

| | |
|---|---|
| ***B01J 23/883*** | (2006.01) |
| ***B01J 21/04*** | (2006.01) |
| ***B01J 35/32*** | (2024.01) |
| ***B01J 35/37*** | (2024.01) |
| ***B01J 35/38*** | (2024.01) |
| ***B01J 35/61*** | (2024.01) |
| ***B01J 35/63*** | (2024.01) |
| ***B01J 35/64*** | (2024.01) |
| ***B01J 37/02*** | (2006.01) |
| ***B01J 37/04*** | (2006.01) |
| ***B01J 37/08*** | (2006.01) |
| ***C10G 47/12*** | (2006.01) |

(52) U.S. Cl.
CPC ............. *B01J 23/883* (2013.01); *B01J 21/04* (2013.01); *B01J 35/32* (2024.01); *B01J 35/37* (2024.01); *B01J 35/38* (2024.01); *B01J 35/615* (2024.01); *B01J 35/633* (2024.01); *B01J 35/635* (2024.01); *B01J 35/647* (2024.01); *B01J 37/0205* (2013.01); *B01J 37/0236* (2013.01); *B01J 37/04* (2013.01); *B01J 37/088* (2013.01); *C10G 47/12* (2013.01); *C10G 2300/1077* (2013.01)

(58) Field of Classification Search
CPC . B01J 23/883; B01J 21/04; B01J 35/32; B01J 35/37; B01J 35/38; B01J 35/615; B01J 35/633; B01J 35/635; B01J 35/647; B01J 37/0205; B01J 37/0236; B01J 37/04; B01J 37/088; B01J 23/85; B01J 37/0009; C10G 47/12; C10G 2300/1077; C10G 47/26
See application file for complete search history.

(56) References Cited

U.S. PATENT DOCUMENTS

| | | | | |
|---|---|---|---|---|
| 3,403,111 | A | 9/1968 | Colgan et al. | |
| 6,203,695 | B1 * | 3/2001 | Harle | B01J 21/04 208/143 |
| 6,309,537 | B1 * | 10/2001 | Harle | C10G 49/04 208/143 |
| 2004/0256293 | A1 * | 12/2004 | Abe | B01J 23/85 502/313 |
| 2006/0060509 | A1 * | 3/2006 | Miyauchi | B01J 35/60 208/210 |

FOREIGN PATENT DOCUMENTS

| | | | |
|---|---|---|---|
| EP | 0972748 | A1 | 1/2000 |
| JP | 4078470 | B2 | 4/2008 |

* cited by examiner

*Primary Examiner* — Ali Z Fadhel
(74) *Attorney, Agent, or Firm* — The Belles Group, P.C.

(57) ABSTRACT

The present invention relates to a method for preparing an improved supported catalyst for hydrocracking of petroleum residue. The method of preparing supported catalyst is considered for possessing textural and mechanical properties for hydrocracking of petroleum residue. The improved supported catalyst comprises formulated alumina support extrudates and at least one metal from Group VIB and VIIIB of the periodic table. The supported catalysts are 0 characterized by definite combination of pseudo-boehmite and mixture of acids followed by metal component molar ratios. The final catalyst with homogeneously dispersed active metals is effective in converting petroleum residue for producing distillates.

17 Claims, No Drawings

METHOD FOR PREPARATION OF CATALYST FOR RESIDUE HYDROCRACKING

CROSS-REFERENCE TO RELATED APPLICATIONS

This U.S. Non-Provisional Patent Application is a U.S. National Stage Application under 35 U.S.C. § 371 of Patent Cooperation Treaty (PCT) Application No. PCT/IN2022/050389, filed on Apr. 26, 2022, which claims priority to Indian Patent Application number 202241013052, filed on Mar. 10, 2022, the entire disclosures of all of which are hereby incorporated by reference herein, for all purposes.

FIELD OF INVENTION

The present invention relates to a method for preparation of a supported catalyst for hydrocracking of residue. More particularly, the present invention relates to a method for preparation of a supported catalyst with improved textural and mechanical properties for hydrocracking of heavy hydrocarbon feeds. The present invention involves application for conversion of heavy hydrocarbon oil feedstock to distillate product using the synthesized supported catalyst in ebullated bed hydrocracking conditions that include a significant quantity of asphaltene content, Conradson Carbon Residue (CCR).

BACKGROUND OF THE INVENTION

The residue comprises of a high amount of contaminants such as sulfur, nitrogen and metal contents. The components in the residue mainly asphaltenes and metals obstruct the effective upgradation of these feeds to low boiling hydrocarbons by deactivating the catalyst or creating operational difficulties. In recent times, the upgradation of residue through hydrogen addition is becoming attractive for refineries to provide a continuous supply of low boiling hydrocarbons. The main technologies for residue hydrocracking are ebullated-bed, slurry, and fixed-bed multistage hydrocracking processes. Among the processes, fixed-bed multistage hydrocracking and ebullated-bed hydrocracking processes utilize shaped catalysts to hydrocrack the residue. There has been a continuous research work to make residue-hydrocracking catalysts with enhanced activity and selectivity to distillates.

European Patent No. 1567262 B1 discloses a second stage heavy oil hydroprocessing catalyst having alumina and silica support with a surface area of 150-170 $m^2/g$ and pore volume of 0.6-0.8 ml/g. U.S. Pat. No. 10,569,254 B2 discloses a catalyst composed of alumina and a metal from Groups 6 and a metal from Group 8, 9 or 10 and phosphorous with pore volume of 0.6 to 1.1 cc/g contributed from a wide range of pore sizes. U.S. Pat. No. 10,570,346 B2 discloses a shaped catalyst for ebullated-bed heavy oil hydroconversion process prepared by co-mulling of the alumina support and metal precursors. U.S. Pat. No. 10,125,327 B2 discloses a catalyst for hydroconversion of residues having a surface area of >100 $m^2/g$ and pore volume of >0.6 cc/g using precipitation method. U.S. Pat. No. 9,068,131 B2 discloses a catalyst composed of alumina extrudates and co-impregnated metals containing molybdenum, nickel and phosphorous. The catalysts have a surface area of 212-217 $m^2/g$ with pore volume of 0.69-0.71 cc/g. U.S. Pat. No. 2020/0360903A1 discloses a catalyst prepared via precipitation, extrusion followed by tri-metal impregnation having a surface area of 190-220 $m^2/g$ and pore volume of 0.32-0.6 ml/g.

From the prior art, it seems that the development of residue hydrocracking catalysts has been done in such way to achieve textural properties and activity. The catalyst characteristics are different for fixed-bed multistage process and ebullated-bed process. In the ebullated-bed residue hydrocracking process, the catalyst is in ebullated state under severe reaction conditions of temperature and hydrogen pressures. Hence, the residue hydrocracking catalyst should possess textural properties and activity provided with enough mechanical strength. Therefore, there is a necessity to develop a catalyst for residue hydrocracking with improved textural properties, activity and mechanical properties.

OBJECTIVE OF THE INVENTION

It is an object of the present invention is to provide a method for preparing a supported catalyst for conversion of residue to middle distillates under ebullated-bed hydrocracking conditions.

An object of the present invention is to provide a supported catalyst with textural properties and mechanical properties.

Another object of the present invention is to provide a method for preparation of alumina support extrudate, supported catalyst, and process for the same.

Another object of the present invention is to provide a process for converting residue into distillates.

SUMMARY OF THE INVENTION

Accordingly, the present invention provides a method for preparing a supported catalyst for hydrocracking of petroleum residue with particularly for conversion of high boiling hydrocarbons to middle distillates.

In one embodiment of the present invention is to provide improved supported catalyst for hydrocracking of residue and for effective conversion of high boiling hydrocarbons to middle distillates with improved mechanical properties of the catalyst to sustain under ebullated bed reaction conditions.

In another embodiment, the present invention provides a supported catalyst for hydrocracking of residue comprising of alumina support extrudates and impregnated metals at least one metal from Group VIB and at least one metal from Group VIIIB of the periodic table. The said alumina support extrudates are prepared by using a mixture of pseudo-boehmite alumina powder and aqueous inorganic acid solution. The first impregnated metal is selected at least one metal from molybdenum and tungsten. The second impregnated metal is selected from at least one metal from cobalt and nickel. The residue hydrocracking catalyst as synthesized by above process resulted a surface area of 170-250 $m^2/g$ and pore volume of 0.2-0.7 cc/g and average crushing strength of 4-6 kg/mm.

In still another embodiment, the present invention provides a supported catalyst for hydrocracking of residue comprising of alumina support extrudates and impregnated metals from at least one metal from Group VIB and VIIIB. The said alumina extrudates are prepared by using a mixture of pseudo-boehmite and a specific mixture of aqueous inorganic acid and organic acid solution. The first impregnated metal is selected from at least one metal from chromium, molybdenum, or tungsten. The second impregnated metal is selected from at least one metal from cobalt, nickel, palladium, platinum or rhodium. The supported catalyst has a surface area in the range of 200-290 $m^2/g$. The supported catalyst has pore volume in the range of 0.4-0.7 cc/g. The supported catalyst has average crushing strength in the range of 8-9 kg/mm.

In yet another embodiment of the present invention provides an improved residue hydrocracking process-using the supported catalyst and processes in accordance with the present invention.

DETAILED DESCRIPTION OF THE INVENTION

Those skilled in the art will be aware that the disclosure is subject to variations and modifications other than those specifically described. It is to be understood that the disclosure includes all such variations and modifications. The disclosure also includes all such steps of the methods or process, features of the product, referred to or indicated in this specification, individually or collectively, and any and all combinations of any or more of such steps or features.

Accordingly, the present invention provides a method for preparation of a supported catalyst for hydrocracking of residue, the method comprising the steps of:

(a) peptizing by mixing and kneading of an alumina precursor with a mixture of acids solution containing an inorganic acid and an organic acid to obtain an extrudable dough;

(b) extruding the extrudable dough into extrudate and drying the extrudate followed by calcination to obtain an alumina support extrudate, wherein the alumina support extrudate is maintained at a molar ratio of $Al_2O_3$ to the total number of moles of acids in the mixture of acids solution is at least 2.5;

(c) impregnating a solution of group VIB metal precursor on the alumina support extrudate of step (b) and then followed by drying and calcination to obtain an impregnated extrudate; and (d) impregnating a solution of group VIIIB metal precursor on the impregnated extrudate of step (c) and then followed by drying and calcination to produce the supported catalyst, wherein the supported catalyst contains at least one metal from Group VIB and at least one metal from Group VIIIB with a total metal content of 4-25 weight percentage with respect to the total weight of the supported catalyst and the atomic ratio of Group VIB metal to Group VIIB metal is at least 1, and wherein the supported catalyst has a surface area of 170-290 $m^2/g$, pore volume of 0.4-0.8 cc/g and an average pore diameter of 6-14 nm.

In one of the features of the present invention, the alumina precursor is selected from boehmite alumina, pseudo-boehmite alumina and mixture thereof; and the alumina precursor is dried at 60-140° C. for a period of 0.5 to 12 hours before peptization step (a).

In another feature of the present invention, the inorganic acid is nitric acid, and the organic acid is selected from the group consisting of butyric acid, propionic acid, acetic acid and formic acid.

In yet another feature of the present invention, the mixture of acids solution having with total number of moles of acids in the solution is 0.05 to 0.9.

In yet another feature of the present invention, the alumina support extrudate is maintained at a molar ratio of $Al_2O_3$ to the total number of moles of acids in the mixture of acids solution at a range of 2.5 to 10.

In yet another feature of the present invention, the alumina support extrudate is dried at room temperature for 0.5 to 6 hours and then at 80-140° C. for 0.5 to 10 hours followed by calcination at 370-650° C. for 0.5 to 12 hours.

In yet another feature of the present invention, the Group VIB metal is selected from chromium, molybdenum and tungsten, and Group VIIIB metal is selected from nickel, cobalt, palladium, platinum and rhodium.

In yet another feature of the present invention, the supported catalyst has a Group VIB metal content maintained at Group VIB metal to Group VIIIB metal atomic ratio of 1 to 5. In one of the preferred features of the present invention, the supported catalyst has a molybdenum content maintained at molybdenum to nickel atomic ratio of 1 to 5.

In yet another feature of the present invention, the supported catalyst has a Group VIIIB metal content maintained at Group VIIIB metal to Group VIB metal atomic ratio of 0.3 to 5. In one of the preferred features of the present invention, the supported catalyst has a nickel content maintained at nickel to molybdenum atomic ratio of 0.3 to 5.

In yet another feature of the present invention, the supported catalyst has an average crushing strength of at least 6 kg/mm, maximum attrition loss is 1 to 2.5 weight percentage, and a bulk density in the range of 0.45 to 0.7 g/cc.

In yet another feature of the present invention, the Group VIB metal precursor is selected from ammonium molybdate and molybdenyl acetylacetonate; and the group VIIIB metal precursor is selected from the group consisting of nickel nitrate hexahydrate, nickel acetate tetrahydrate, and nickel sulphate hexahydrate.

In yet another feature of the present invention, the residue is vacuum residue or mixture of hydrocarbons of at least 40-80 wt % boiling above 540° C.+.

The present invention also provides a process for hydrocracking of residue to distillates, wherein the supported catalyst as obtained by the above method, is used in a hydrocracking stage of ebullated-bed reactors or fixed bed reactors contains single or multiple reactors operated in series for processing residue.

In one of the features of the present invention, the ebullated-bed reactor hydrocracking stage is operated at a partial pressure of between about 80 bars and about 210 bars; an operating temperature of between about 380° C. and about 490° C.; a liquid hourly space velocity of between about 0.15 $h^{-1}$ and about 4.0 $h^{-1}$.

In another feature of the present invention, the supported catalyst exhibits the conversion of residue in the range of 60-95%.

In various aspects of the present invention, the supported catalyst and process are provided for hydrocracking of residue into distillates. The feedstock described herein is preferably residue containing a high amount of sulfur, asphaltenes and CCR content. The supported catalyst presented herein is preferably to deal with hydrocracking of heavy hydrocarbon oil. The fixed bed multi-stage or ebullated-bed hydroprocessing of residual oil comprises of dedicated catalysts with variation in functionalities. The major functionalities of these catalysts are hydrodemetallization, hydrodesulfurization, hydrocracking, hydrodenitrogenation and hydrogenation. The supported catalyst presented herein are preferably having the functionality inclusive of hydrogenation, hydrodesulfurization, of hydrocracking of residue hydrodenitrogenation and hydrodearomatization.

The catalysts in the ebullated-bed process are supported extrudates in ebullition state under severe reaction conditions. Nevertheless, the catalysts should possess textural properties and activity provided with enough mechanical strength. The supported catalyst presented herein is preferably to use as hydrocracking catalyst in a fixed bed multi-stage or ebullated-bed hydrocracking of residue. The support of hydrocracking catalyst interacts with the active component, leading to beneficial catalytic activity. Active metals are important for the hydrodesulfurization and hydrogenation activity. The primary function of catalyst is to dissociate molecular hydrogen, which can readily hydrogenate unsaturated and cracked oil.

The supported catalyst presented herein preferably contains formulated alumina extrudates as support material. The precursors for formulated alumina extrudates are preferably boehmite and/or pseudo-boehmite alumina with formula γ-AlOOH. The boehmite and/or pseudo-boehmite alumina is peptized, extruded and dried followed by calcination results alumina support extrudates. Each step involved in this process has an influence on the textural and mechanical properties of the resultant alumina extrudates.

The alumina support extrudates presented herein are preferably prepared by peptization of boehmite and/or pseudo-boehmite alumina powder with individual and/or mixed acid solutions of nitric acid, butyric acid, propionic acid, acetic acid and formic acid. During the peptization process, the aggregates of alumina are breakdown into an assembly of primary particles. It is a chemical process where the type, strength and amount of acid is decisive in controlling the pore structure and mechanical strength of the alumina support extrudates.

The alumina support extrudates presented herein are preferably prepared by peptization of boehmite and/or pseudo-boehmite alumina powder with the nitric acid solution. The peptization is conducted in such a way that the molar ratio of $Al_2O_3$ to total moles of nitric acid in solution is maintained at 0 to 50. More preferably, the mole ratio is maintained at 1 to 30. Most preferably, the mole ratio is maintained at 2.5 to 26.

The alumina support extrudates presented herein are more preferably prepared by peptization of boehmite and/or pseudo-boehmite alumina powder with a mixture of one strong acid and weak acid solutions. The strong acid used in the present disclosure is preferably nitric acid. The weak acid used in the present disclosure is preferably an organic acid selected from a group of acids of butyric acid, propionic acid, acetic acid and formic acid. There are advantages of using mixture of acids as peptizing solution for peptization of boehmite and/or pseudo-boehmite alumina powder. In the presence of strong acid concentrations, there is dissolution of some fraction of boehmite and/or pseudo-boehmite alumina. The $Al^{3+}$ cations will be associated with the anions of the weak acid forming complex structures that will be decomposed during the calcination step. The presence of weak organic acid acts as a plasticizer in presence of strong nitric acid during the peptization and extrusion. Another advantage of the mixed acid solution is the weak organic acid declines the strength of strong nitric acid and thereby reducing corrosive nature of the nitric acid. With all these influences there exist a synergy between the boehmite and/or pseudo-boehmite alumina powder with mixture of one strong acid and weak acid solutions at a definite mole ratio of $Al_2O_3$ to total number of moles of acids for producing alumina extrudates with desired textural properties and mechanical strength.

The alumina support extrudates presented herein are preferably prepared by peptization of boehmite and/or pseudo-boehmite alumina powder with a mixture of one strong acid and weak acid solutions. The strong acid used in the present disclosure is preferably nitric acid. The weak acid used in the present disclosure is preferably an organic acid selected from group of acids of butyric acid, propionic acid, acetic acid and formic acid. Before peptization, the boehmite and/or pseudo-boehmite alumina powder is dried at 60-140° C. for a period of 0.5 to 12 hours. The peptization is conducted at the molar ratio of $Al_2O_3$ to total moles of nitric acid and organic acid in solution is maintained at 1 to 20. More preferably, the molar ratio is maintained at 2 to 12. Most preferably, the molar ratio is maintained at 2.5 to 10.

The boehmite and/or pseudo-boehmite alumina powder with a mixture of one strong acid and weak acid solution is mixed and kneaded to make an extrudable paste. The extrudable paste is extruded into cylindrical extrudates having a diameter of 0.7 to 2.0 mm, more preferably 0.8 to 1.2 mm. The alumina support extrudates presented herein are preferably dried at room temperature for a period in the range of 0.5 to 24 hours and at 80-110° C. for a period in the range of 0.5-15 hours. More preferably, the drying is conducted at room temperature for a period of 0.5 to 10 hours and at 90-120° C. for a period of 0.5 to 10 hours. The support alumina extrudates presented herein are preferably calcined at a temperature of 300 to 700° C. for a period of 1-12 hours. More preferably, calcined at a temperature of 370 to 650° C. for a period of 3-10 hours.

The supported catalyst presented herein preferably contain alumina support extrudates and impregnated metals at least one metal from Group VIB and at least one metal from Group VIIIB of the periodic table. It is desirable to have a homogeneous dispersion of the two metals over the alumina support extrudates thereby the catalyst delivers better activity and selectivity towards middle distillates.

The supported catalysts presented herein preferably contain a total metal weight percentage of not greater than 25%, more preferably not greater than 20% with respect to the total weight of the catalyst. The molybdenum content in the total catalyst is maintained in such a way that the atomic ratio of molybdenum to nickel is at 1 to 8, more preferably at 1 to 5. The impregnation solution is prepared by dissolving a Group VIB metal precursor in a solvent and the solution is impregnated with alumina support extrudates. The solvent is selected from water, ethanol, and methanol. The Group VIB metal precursor is selected from ammonium molybdate and molybdenyl acetylacetonate. The impregnated extrudates were dried at 80-150° C. for 2-20 hours and calcined at 370-800° C. for 1-18 hours. More preferably, the extrudates were dried at 90-130° C. for 2-15 hours and calcined at 400-620° C. for 1-10 hours. The nickel content in the total catalyst is maintained in such a way that the atomic ratio of nickel to molybdenum is at 0.2 to 6, more preferably at 0.3 to 5. The impregnation solution is prepared by dissolving Group VIIIB metal precursor in a solvent and the solution is impregnated with support alumina extrudates. The solvent is selected from water, ethanol, and methanol. The Group VIIIB metal precursor is selected from the group consisting of nickel nitrate hexahydrate, nickel acetate tetrahydrate, and nickel sulphate hexahydrate. The impregnated extrudates were dried at 80-140° C. for 2-12 hours and calcined at 400-700° C. for 1-18 hours. More preferably, the extrudates were dried at 90-120° C. for 2-8 hours and calcined at 400-620° C. for 1-8 hours.

The catalyst employed in the ebullated bed reactor must have adequate mechanical strength to stand the weight of the catalyst bed itself to ensure proper ebullition state. In this respect, catalysts for hydroprocessing of heavy feeds suffer more than those used for hydrotreatment of light feeds since the mechanical strength of a macroporous pellet is less than that of a microporous one. The breaking of the catalyst particles in ebullated bed reactor can cause critical problems.

Catalyst attrition is defined as the fines produced by the collisions among the catalyst particles and the catalyst-to-wall impacts. The mode of attrition may vary from pure abrasion to a total fragmentation of the particles. Abrasion causes a slightly change in the particle size distribution of the original particle due to the particle surface damage at harsh conditions, while the fragmentation is a process of particle breakage into similarly sized pieces. In general, low amounts of dry attrition and fines are good for less sedimentation.

The catalysts prepared in the present invention have preferable surface area in the range of 170 to 290 $m^2/g$ and pore volume of 0.4 to 0.7 cc/g with an average pore diameter of 6 to 14 nm. The average crushing strength of supported catalysts is 4 to 10 kg/mm and attrition of 1-to 5 weight percentage and average bulk density of 0.45 to 1 g/cc.

In a two stage ebullated bed process such as demetallization stage and hydrocracking stage, the catalyst of the present invention tested at operating conditions for the ebullated bed hydrocracking stage include a total pressure preferably between about 80 bars and about 210 bars; an operating temperature of between about 380° C. and about 490° C.; a liquid hourly space velocity of between about 0.15 $h^{-1}$ and about 4.0 $h^{-1}$.

EXAMPLES

The following examples are presented to further illustrate certain aspects of the present disclosure, but they are not to be considered as limiting the scope of the present disclosure.

Example 1

The preparation of Example 1 supported catalyst includes the initial preparation of support extrudates. A desired amount of pseudo-boehmite alumina powder was dried at 120° C. for 4 hours. The dried powder was mixed with the nitric acid solution which is maintained at a molar ratio of $Al_2O_3$ to the number of moles of nitric acid is 25.8 and then kneaded into an extrudable dough. The extrudable dough was extruded into extrudates with diameter of ~1 mm. The extrudates were dried at room temperature for 2 hours and then at 120° C. for 9 hours followed by calcination at 550° C. for 4 hours with 4° C./min ramping in a muffle furnace. The calcined extrudates were used as support material for the supported catalyst. A solution of ammonium heptamolybadate with molybdenum content which is maintained at molybdenum to nickel atomic ratio of 1.53 in the final catalyst is impregnated on the calcined extrudates and dried at 110° C. for 6 hours followed by calcination at 550° C. for 4 hours with 4° C./min ramping in a muffle furnace. A solution of nickel nitrate hexahydrate with nickel content which is maintained at nickel to molybdenum atomic ratio of 0.65 in the final catalyst is impregnated on calcined material and dried at 110° C. for 6 hours followed by calcination at 550° C. for 4 hours with 4° C./min ramping in a muffle furnace to produce the final catalyst. The properties of the catalyst are presented in Table 1.

TABLE 1

| Property | Value |
|---|---|
| Surface area ($m^2/g$) | 174 |
| Pore volume (cc/g) | 0.5 |
| Average pore diameter (nm) | 6.2 |
| Bulk Density (g/cc) | 0.64 |
| Average Crush Strength (kg/mm) | 4.3 |
| Attrition (wt. %) | 2.9 |

Example 2

The preparation of Example 2 supported catalyst includes the initial preparation of support extrudates. A desired amount of pseudo-boehmite alumina powder was dried at 120° C. for 4 hours. The dried powder was mixed with aqueous nitric acid solution which is maintained at a molar ratio of $Al_2O_3$ to the number of moles of nitric acid is 2.58 and then kneaded into an extrudable dough. The extrudable dough was extruded into extrudates with diameter~1 mm. The extrudates were dried at room temperature for 2 hours and then at 120° C. for 9 hours followed by calcination at 550° C. for 4 hours with 4° C./min ramping in a muffle furnace. The calcined extrudates were used as support material for the supported catalyst. A solution of ammonium heptamolybadate with molybdenum content which is maintained at molybdenum to nickel atomic ratio of 1.53 in the final catalyst is impregnated on the calcined extrudates and dried at 110° C. for 6 hours followed by calcination at 550° C. for 4 hours with 4° C./min ramping in a muffle furnace. A solution of nickel nitrate hexahydrate with nickel content which is maintained at nickel to molybdenum atomic ratio of 0.65 in the final catalyst is impregnated on calcined material and dried at 110° C. for 6 hours followed by calcination at 550° C. for 4 hours with 4° C./min ramping in a muffle furnace to produce the final catalyst. The properties of the catalyst are presented in Table 2.

TABLE 2

| Property | Value |
|---|---|
| Surface area ($m^2/g$) | 252 |
| Pore volume (cc/g) | 0.56 |
| Average pore diameter (nm) | 8.0 |
| Bulk Density (g/cc) | 0.62 |
| Average Crush Strength (kg/mm) | 6.4 |
| Attrition (wt. %) | 2.1 |

Example 3

The preparation of Example 3 supported catalyst includes the initial preparation of support extrudates. A desired amount of pseudo-boehmite alumina powder was dried at 120° C. for 4 hours. The dried powder was mixed with aqueous acetic acid solution which is maintained at molar ratio of $Al_2O_3$ to the total moles of acetic acid is 2.58 and then kneaded into an extrudable dough. The extrudable dough was extruded into extrudates with diameter~1 mm. The extrudates were dried at room temperature for 2 hours and then at 120° C. for 9 hours followed by calcination at 550° C. for 4 hours with 4° C./min ramping in a muffle furnace. The calcined extrudates were used as support material for the supported catalyst. A solution of ammonium heptamolybadate with molybdenum content which is maintained at molybdenum to nickel atomic ratio of 1.53 in the final catalyst is impregnated on the calcined extrudates and dried at 110° C. for 6 hours followed by calcination at 550° C. for 4 hours with 4° C./min ramping in a muffle furnace. A solution of nickel nitrate hexahydrate with nickel content which is maintained at nickel to molybdenum atomic ratio of 0.65 in the final catalyst is impregnated on calcined material and dried at 110° C. for 6 hours followed by calcination at 550° C. for 4 hours with 4° C./min ramping in a muffle furnace to produce the final catalyst. The properties of the catalyst are presented in Table 3.

TABLE 3

| Property | Value |
|---|---|
| Surface area ($m^2/g$) | 224 |
| Pore volume (cc/g) | 0.45 |
| Average pore diameter (nm) | 7.1 |
| Bulk Density (g/cc) | 0.64 |
| Average Crush Strength (kg/mm) | 4.0 |
| Attrition (wt. %) | 2.3 |

Example 4

The preparation of Example 4 supported catalyst includes initial preparation of support extrudates. A desired amount of pseudo-boehmite alumina powder was dried at 120° C. for 4 hours. The dried powder was mixed with a mixture of aqueous nitric acid and acetic acid solutions which is maintained at molar ratio of $Al_2O_3$ to the total moles of nitric acid and acetic acid is 1.88 and then kneaded into an extrudable dough. The extrudable dough was extruded into extrudates with diameter of ~1 mm. The extrudates were dried at room temperature for 2 hours and then at 120° C. for 9 hours followed by calcination at 550° C. for 4 hours with 4° C./min ramping in a muffle furnace. The calcined extrudates were used as support material for the supported catalyst. A solution of ammonium heptamolybadate with molybdenum content which is maintained at molybdenum to nickel atomic ratio of 1.53 in the final catalyst is impregnated on the calcined extrudates and dried at 110° C. for 6 hours followed by calcination at 550° C. for 4 hours with 4° C./min ramping in a muffle furnace. A solution of nickel nitrate hexahydrate with nickel content which is maintained at nickel to molybdenum atomic ratio of 0.65 in the final catalyst is impregnated on calcined material and dried at 110° C. for 10 hours followed by calcination at 550° C. for 4 hours with 4° C./min ramping in a muffle furnace to produce the final catalyst. The properties of the catalyst are presented in Table 4.

TABLE 4

| Property | Value |
|---|---|
| Surface area ($m^2/g$) | 241 |
| Pore volume (cc/g) | 0.56 |
| Average pore diameter (nm) | 8.4 |
| Bulk Density (g/cc) | 0.61 |
| Average Crush Strength (kg/mm) | 6.3 |
| Attrition (wt. %) | 1.8 |

Example 5

The preparation of Example 5 supported catalyst includes initial preparation of support extrudates. A desired amount of pseudo-boehmite alumina powder was dried at 120° C. for 4 hours. The dried powder was mixed with a mixture of aqueous nitric acid and acetic acid solutions which is maintained at molar ratio of $Al_2O_3$ to the total moles of nitric acid and acetic acid is 3.46 and then kneaded into an extrudable dough. The extrudable dough was extruded into extrudates with diameter of ~1 mm. The extrudates were dried at room temperature for 2 hours and then at 120° C. for 9 hours followed by calcination at 550° C. for 4 hours with 4° C./min ramping in a muffle furnace. The calcined extrudates were used as support material for the supported catalyst. A solution of ammonium heptamolybadate with molybdenum content which is maintained at molybdenum to nickel atomic ratio of 1.53 in the final catalyst is impregnated on the calcined extrudates and dried at 110° C. for 6 hours followed by calcination at 550° C. for 4 hours with 4° C./min ramping in a muffle furnace. A solution of nickel nitrate hexahydrate with nickel content which is maintained at nickel to molybdenum atomic ratio of 0.65 in the final catalyst is impregnated on calcined material and dried at 110° C. for 10 hours followed by calcination at 550° C. for 4 hours with 4° C./min ramping in a muffle furnace to produce the final catalyst. The properties of the catalyst are presented in Table 5.

TABLE 5

| Property | Value |
|---|---|
| Surface area ($m^2/g$) | 287 |
| Pore volume (cc/g) | 0.69 |
| Average pore diameter (nm) | 10 |
| Bulk Density (g/cc) | 0.58 |
| Average Crush Strength (kg/mm) | 9.8 |
| Attrition (wt. %) | 1.2 |

Example 6

To demonstrate the process advantages of this invention, catalyst mentioned in Example-5 testing was performed IL ebullated bed reactor at hydrocracking stage conditions. The feed used in this process is heavy hydrocarbon feed derived after demetallization stage with characteristics of 50-wt % boiling above 540° C., sulfur content of 4.3 wt %, asphaltene content of 11%, and CCR of 18%. Ebullated bed hydrocracking reaction performed at 435° C. and 175 bar of hydrogen pressure with residence time of 2 h. During the reaction, catalyst is maintained in ebullated state by mixing. The liquid product is characterized through simulated distillation to get the different fractions. The activity results are presented in Table 6.

TABLE 6

| Products | Yield (%) |
|---|---|
| C1, C2 | 3.1 |
| $H_2S$ | 1.3 |
| LPG (C3 & C4) | 1.5 |
| Naphtha (IBP-180° C.) | 13.8 |
| Middle distillates (180-370° C.) | 48.3 |
| VGO (370-540° C.+) | 23.6 |
| Residue (540° C.+) | 8.4 |
| Conversion (%) | 91.6 |

Conversion of 91.6% is achieved with distillate yields of ~86% (180-540° C. fraction) and improved sulfur, asphaltene, and CCR conversions. After the reaction, from the spent catalyst characterization, it is observed that supported catalyst retained superior mechanical properties in terms of attrition and crushing strength.

We claim:

1. A method for preparation of a supported catalyst for hydrocracking of residue, the method comprising:

(a) peptizing by mixing and kneading of an alumina precursor with a mixture of acids solution containing an inorganic acid and an organic acid to obtain an extrudable dough;

(b) extruding the extrudable dough into extrudate and drying the extrudate followed by calcination to obtain an alumina support extrudate, wherein the alumina support extrudate is maintained at a molar ratio of $Al_2O_3$ to the total number of moles of acids in the mixture of acids solution is at least 2.5;

(c) impregnating a solution of group VIB metal precursor on the alumina support extrudate of step (b) and then followed by drying and calcination to obtain an impregnated extrudate; and (d) impregnating a solution of group VIIIB metal precursor on the impregnated extrudate of step (c) and then followed by drying and calcination to produce the supported catalyst;

wherein the supported catalyst contains at least one metal from Group VIB and at least one metal from Group VIIIB with a total metal content of 4-25 weight percentage with respect to the total weight of the supported catalyst and the atomic ratio of Group VIB metal to Group VIIB metal is at least 1; and wherein the supported catalyst has a surface area of 170-290 $m^2/g$, pore volume of 0.4-0.8 cc/g and an average pore diameter of 6-14 nm.

2. The method of claim 1, wherein the alumina precursor is selected from boehmite alumina, pseudo-boehmite alumina and mixture thereof; and wherein the alumina precursor is dried at 60-140° C. for a period of 0.5 to 12 hours before peptization step (a).

3. The method of claim 1, wherein the inorganic acid is nitric acid, and wherein the organic acid is selected from the group consisting of butyric acid, propionic acid, acetic acid and formic acid.

4. The method of claim 1, wherein the mixture of acids solution having with total number of moles of acids in the solution is 0.05 to 0.9.

5. The method of claim 1, wherein the alumina support extrudate is maintained at a molar ratio of $Al_2O_3$ to the total number of moles of acids in the mixture of acids solution at a range of 2.5 to 10.

6. The method of claim 1, wherein the alumina support extrudate is dried at room temperature for 0.5 to 6 hours and then at 80-140° C. for 0.5 to 10 hours followed by calcination at 370-650° C. for 0.5 to 12 hours.

7. The method of claim 1, wherein the Group VIB metal is selected from chromium, molybdenum and tungsten, and wherein the Group VIIIB metal is selected from nickel, cobalt, palladium, platinum and rhodium.

8. The method of claim 7, wherein the supported catalyst has a Group VIB metal content maintained at a Group VIB metal to Group VIIIB metal atomic ratio of 1 to 5.

9. The method of claim 7, wherein the supported catalyst has a Group VIIIB metal content maintained at a Group VIIIB metal to Group VIB metal atomic ratio of 0.3 to 5.

10. The method of claim 1, wherein the supported catalyst has an average crushing strength of at least 6 kg/mm, maximum attrition loss is 1 to 2.5 weight percentage, and a bulk density in the range of 0.45 to 0.7 g/cc.

11. The method of claim 1, wherein the Group VIB metal precursor is selected from ammonium molybdate and molybdenyl acetylacetonate; and the group VIIIB metal precursor is selected from the group consisting of nickel nitrate hexahydrate, nickel acetate tetrahydrate, and nickel sulphate hexahydrate.

12. The method of claim 1, wherein the residue is vacuum residue or mixture of hydrocarbons of at least 40-80 wt % boiling above 540° C.+.

13. A process for hydrocracking of residue to distillates, wherein the supported catalyst as obtained by the method of claim 1 is used in a hydrocracking stage of ebullated-bed reactors or fixed bed reactors contains single or multiple reactors operated in series for processing residue.

14. The process of claim 13, wherein the ebullated-bed reactor hydrocracking stage is operated at a partial pressure of between about 80 bars and about 210 bars.

15. The process of claim 13, wherein the supported catalyst exhibits the conversion of residue in the range of 60-95%.

16. The process of claim 13, wherein the ebullated-bed reactor hydrocracking stage is operated at an operating temperature of between about 380° C. and about 490° C.

17. The process of claim 13, wherein the ebullated-bed reactor hydrocracking stage is operated at a liquid hourly space velocity of between about 0.15 $h^{-1}$ and about 4.0 $h^{-1}$.

* * * * *